United States Patent [19]
Choi et al.

[11] Patent Number: 5,282,097
[45] Date of Patent: Jan. 25, 1994

[54] AUTOMATIC SEARCH METHOD FOR A RECORD/PLAY SYSTEM

[75] Inventors: Seung-lyul Choi, Suwon; Kweon-pyo Hong, Euiwang-city, both of Rep. of Korea

[73] Assignee: SamSung Electronics Co. Ltd., Suwon, Rep. of Korea

[21] Appl. No.: 641,275

[22] Filed: Jan. 15, 1991

[30] Foreign Application Priority Data

Mar. 21, 1990 [KR] Rep. of Korea .................. 90-3820

[51] Int. Cl.$^5$ .............................................. G11B 19/02
[52] U.S. Cl. .................................. 360/72.2; 360/73.01; 360/73.06; 360/74.1; 360/74.4; 369/54
[58] Field of Search ............... 360/69, 71, 72.2, 73.01, 360/73.03, 74.1, 74.4, 74.6, 73.04, 73.06; 369/32, 54, 58

[56] References Cited

U.S. PATENT DOCUMENTS

| | | | |
|---|---|---|---|
| 3,893,177 | 7/1975 | Takehaka | 360/72.1 |
| 4,413,292 | 11/1983 | Sugiyama et al. | 360/72.2 |
| 4,636,878 | 1/1987 | Murayama | 360/71 |
| 4,766,507 | 8/1988 | Kashida et al. | 360/74.4 |
| 4,817,075 | 5/1989 | Kikuchi et al. | 360/72.2 |
| 4,845,577 | 7/1990 | Georgis et al. | 360/72.2 |
| 4,956,730 | 9/1990 | Arai et al. | 360/70 |
| 5,021,896 | 6/1991 | Horino | 360/70 |
| 5,047,879 | 9/1991 | Fukatsu | 360/72.1 |

FOREIGN PATENT DOCUMENTS

| | | | |
|---|---|---|---|
| 2216077 | 10/1973 | Fed. Rep. of Germany | 360/73.01 |
| 0078456 | 3/1989 | Japan | 360/73.01 |

Primary Examiner—William L. Sikes
Assistant Examiner—Terry D. Cunningham
Attorney, Agent, or Firm—Robert E. Bushnell

[57] ABSTRACT

An automatic search apparatus for a record/play system of a record medium having a plurality of recorded programs, and a controlling method thereof. The apparatus discriminates the presence of recorded programs on the record medium by picking-up signals from the medium, converting them to binary signals and comparing them with reference to some prescribed terms, thus discriminating the end of a program or recorded region, then finds the start position of it. In a preferred form, the search process includes appropriate stepwise acceleration/deceleration of advancing speed of the record medium. The invention results in a simple and inexpensive construction of an automatic search apparatus for various application fields.

10 Claims, 5 Drawing Sheets

AUTOMATIC SEARCH METHOD FOR A RECORD/PLAY SYSTEM

FIELD OF THE INVENTION

The present invention relates to an automatic search apparatus for a record/play system and a controlling method thereof, and particularly to an automatic search apparatus for automatically delivering the record medium to the start position of a recorded program and a controlling method suitable for controlling the apparatus.

BACKGROUND OF THE INVENTION

Nowadays, various record/play systems using a variety of record mediums, are widely in use, for example, a Video Tape or Cassette Recorder, an audio tape recorder, or a Video or Compact Disc Player.

On those record mediums, one or more programmed data or programs are recorded and reproduced, and nonrecorded regions are usually set between program recorded regions, for separating the same. And regions not available for recording, for example a leader portion and a trailer portion in a video tape, are generally provided for informing the beginning and ending of the record available region to the system.

In the record available region of the record medium, a number of programs are usually recorded with the non recorded regions as dividers. Therefore, to find the start position of a program wanted or a program on normal reproducing (hereinafter, referred to as PLAY) in a conventional record/play system, it requires a series of complicated and troublesome operations of function keys, for example, keys for fast forward advancing (hereinafter referred to as F/F), fast rewinding (REW), PLAY or stop (STOP), for partly reproducing the content of recorded programs and verifying them one by one with the user's own eye and ear.

To solve the problems, some systems have been suggested for searching a required program by directions provided through a keyboard after writing search information on the record medium. For example, there are the Video Index Search System (VISS), the Video Address Search System (VASS) and the program selecting system.

In the VISS system, index information is optionally written on appropriate positions of record medium, then a required program is found by searching the index information with keyboard operation. In the VASS system, a required program is found by directing address of the program after allocating specific addresses to the each sections of the record medium. And the program selecting system is mainly adopted for a CDP system.

But, the above described systems are not suitable for general use for their complicated structures and accompanying high production costs.

Moreover, the conventional systems generate noise as they continue to reproduce the record medium until finding the end position of the medium even after completing the reproduction of the recorded region, and require a series of troublesome operations of function keys to find the start position of the recorded programs on loading the medium to the system, as described above.

And the systems cannot execute the automatic search operation when the search information is lost by local damages of the record medium, for example.

SUMMARY OF THE INVENTION

Therefore, it is an object of the present invention to provide an automatic search apparatus for a record/play system, which can be fabricated in a simple and economic manner, and can avoid unwanted reproduction of non recorded regions and not be affected by local damage of the record medium.

It is another object of the present invention to provide a method for controlling the above apparatus.

To achieve these and other objects, the automatic search apparatus for a record/play system according to the present invention for recording and reproducing one or a plurality of programs on a record medium being divided by nonrecord regions comprises:

means for ordering a user's directions, including a direction for setting an automatic search mode, to control the system;

means for driving the record medium;

means for picking up the recorded data from the record medium as electric signals;

means for detecting a signal present state and a signal absent state according to the presence of recorded data on the record medium by converting at least a part of the picked-up electric signals of the pick-up means;

means for controlling the driving means to deliver the record medium to the start position of one of the programs on detecting a signal absent state longer than a prescribed upper limit term by the detecting means when the automatic search mode is directed through the ordering means.

And a method suitable for controlling the apparatus as above comprises:

When the automatic search mode is not directed, a process for executing normal operation modes of the system; whereas when the automatic search mode is directed, a signal detecting process for causing the driving means to drive the record medium fast and the pickup means to read out the recorded data on the record medium as electric signals, and the detecting means to convert the picked-up electric signals into detection signals depending on the presence of the recorded data;

a forward search process for finding the start position of one of the recorded programs on detecting the signal absent state shorter than the prescribed upper limit term;

a reverse search process for finding the start position of one of the recorded programs with the record medium being derived reversely driven on detecting the signal absent state longer than the upper limit term; and a reproduction process for reproducing the recorded program according to the user's direction on finding the start position of the program, and returning to the reverse search process on detecting the signal absent state longer than another prescribed upper limit term during reproducing of the program.

BRIEF DESCRIPTION OF THE DRAWINGS

Preferred embodiments of the automatic search apparatus and the controlling method thereof according to the present invention, will now be described in detail with reference to accompanying drawings, in which.

DETAILED DESCRIPTION

Figure 1:
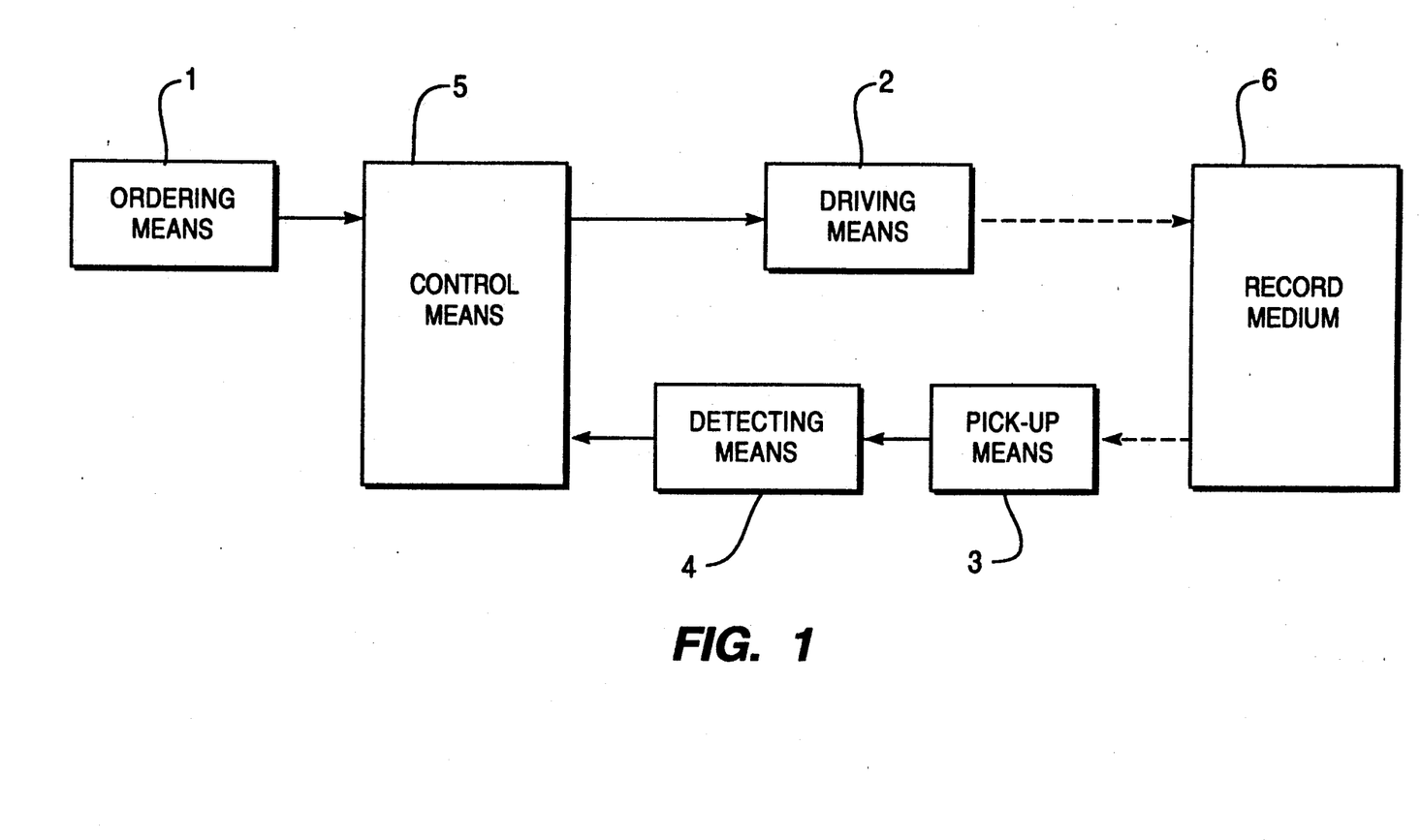
FIG. 1 is a block diagram showing an automatic search apparatus according to the present invention.

As shown in FIG. 1, the automatic search apparatus according to the present invention, comprises an ordering means 1, a driving means 2, a pick-up means 3, a detecting means 4 and a control means 5.

The ordering means 1 is for inputting the user's directions about the operations of the system. It generally includes a knob panel or keyboard having ten keys and function keys of corresponding operation modes such as Power On, PLAY, F/F, REW and the like, and a key matrix for generating appropriate electric signals to be fed to the control means 5. According to the present invention, an additional function key corresponding to an automatic search mode will preferably be included in the ordering means 1.

The driving means 2 is for driving a record medium 6 at prescribed advancing speeds and directions according to the operation mode directed by the ordering means 1, includes a motor, a motor driving circuit and speed and direction control circuits in a preferred form.

The pick-up means 3 is for picking-up the recorded data from the record medium 6 and feeding them to an unshown reproducing system and the detecting means 5. If the record medium 6 is a magnetic tape, the means is embodied in a magnetic pick-up apparatus including a magnetic head, for example. Whereas, if the medium is an optical disc such as a laser disc or a compact disc, the means goes to an optical pick-up apparatus. And if the medium 6 is to be a punch card or tape, the means will be an optical reader including appropriate optical sensors. If necessary, some amplifiers will be added to the pick-up means 3 for amplifying the picked-up signal.

The detecting means 4 is for receiving at least a part of the picked-up signals from the pick-up means, then converting them to produce detection signals expressing the presence of the recorded data on the record medium 6. For example, it produces a HIGH signal for the signal present region, whereas a LOW signal for the signal absent region.

The control means 5 controls components of the apparatus and the record/play system according to the user's direction inputted through the ordering means 1, is preferably constituted by a micro processor or an appropriate logical operation gate array.

The control means 5 controls the system to various operation modes, for example Power On, STOP, PLAY, F/F, REW mode, especially when the automatic search mode (Hereinafter, referred to as AS mode) is directed, it controls the apparatus as follows:

After the system being Powered On and the record medium 6 being loaded on the deck of the system to execute a STOP or PLAY mode, if the AS mode is directed through the ordering means 1, the control means 5 motivates the record medium 6 to be fast forward advancing (F/F) through the driving means 2. In the fast forward advancing, the presence of recorded signals on the record medium 6 is continuously detected through the pick-up means 3 and the detecting means 4.

Here, it will be preferable to neglect the signal absent state shorter than a prescribed term as there may be intermediate intervals between programs or local data losses caused by partial damages of the medium in the recorded region. Therefore, a lower limit term is set to the maximum length of the probable intermediate intervals or the local data losses in the program. Meanwhile, a upper limit term is set to the length being same or appropriately longer than the maximum length of probable signal absent regions for dividing the programs in the record available region of the record medium 6.

Upon executing the fast forward search of the record medium 6, if a signal absent state longer than the lower limit term is detected, the control means 5 waits for the detection of signal present state for the time being. Here, if the signal present state is not detected within the above described upper limit term, the control means concludes it to be the end of the recorded region, and then rewinds the record medium 6 to find the start position of the signal present region, i.e., start position of the program. And similar operations will be executed in the case of finding the trailer of the record medium by other sensors in fast forward search procedure.

Meanwhile, if the signal present state is detected within the upper limit term in fast forward search of the record medium 6, the control means 5 makes the system to be operated according to the previous mode before the direction of AS mode setting. For example, if the previous mode was a STOP mode, the system waits for a following direction being at the STOP mode after completing the automatic search; whereas if the previous mode was a PLAY mode, the searched program is reproduced at a normal speed.

If the reproduction of the recorded program is completed, the control means 5 detects the presence of the recorded program again, if the signal absent state longer than the upper limit term is detected, the control means concluded it to be the end of the recorded region, then rewinds the record medium 6 to find the start position of a recorded program.

In the above mentioned automatic search procedure, it will be preferable to control the advancing speed of the record medium to be reduced to some intermediate speeds between the fast forward advancing speed and the normal reproducing speed. Then, it is possible to reduce the detection error and exactly find the start position of the program, and to reduce the damages of the record medium by impacts to the medium caused by a sudden braking and others. In the same ground, it is also preferable to control the advancing speed of the record medium to be stepwisely accelerated in the beginning of the automatic search. For example, when it is found a signal absent state longer than the lower limit term in the fast forward search, then the advancing speed of the record medium is appropriately reduced to execute the search operation; the speed will be stepwisely accelerated to intermediate speeds between the present advancing speed and the fast forward advancing on receiving the input of the direction key of AS mode.

In the above descriptions, the upper limit term has been set to the value longer than the maximum length of dividing regions between recorded programs and it finds the start position of the first program among a plurality of recorded programs on finding the end of the recorded region, but the search of the start position of an arbitrary program may also be possible. In detail, if a first upper limit term is set to be appropriately longer than the maximum length of dividing regions between programs, and a second upper limit term is set to be appropriately shorter than it, thereby enabling to find the start position of the first program in the recorded region or that of arbitrary program.

Figure 2:
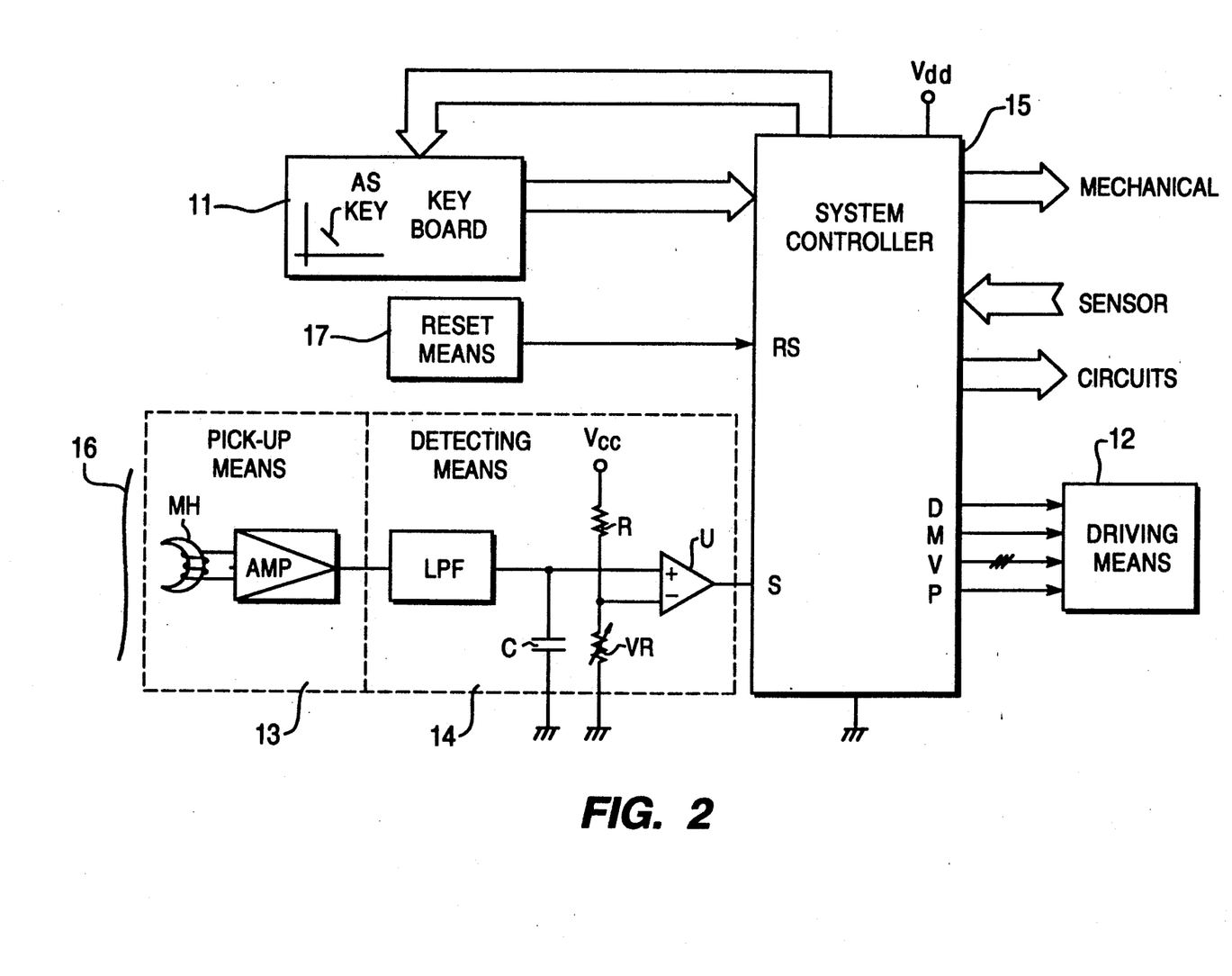
FIG. 2 is a system diagram showing an example of the apparatus being applied to Video Cassette Recorder.

FIG. 2 shows an example of VTR (Video Tape Recorder) adopting the automatic search apparatus shown in FIG. 1 according to the present invention.

A keyboard 11 is constructed by adding a AS mode direction key to a conventional key input device which includes a keypad having function and ten keys and a key matrix portion for converting the direction inputted through the keypad into electric signals, therefore detailed description will be omitted.

A system controller 15 is preferably constituted with an appropriate micro processor, and controls mechanical parts and circuits of the system and a driving means 12 depending on the user's direction inputted through the keyboard 11, data presence signals inputted through a detecting means 14 and detection signals fed from other sensors. Although the sensors for feeding detection signals to the system controller 15 is not illustrated separately in drawings, there will be optical sensors, micro switches, humidity sensors or head position sensors and others for detecting loading, advancing, stop and unloading of the video tape 16, especially for detecting the leader and trailer of the video tape 16.

A reset means 17 feeds reset signal to the reset terminal RS of the system controller 15 for initializing when the system is Powered On.

A pick-up means 13 includes a magnetic head MH and an amplifier AMP, and picks-up the recorded signal from the video tape 16 to feed them to an unshown reproduction system, and feeds a part of the picked-up signal to a detecting means 14.

The detecting means 14 includes a low pass filter LPF, a comparator U, a resistor R and a variable resistor VR in a preferred form. The signals picked-up and amplified by pick-up means 13 are digitalized through the low pass filter LPF, then fed to the (+) terminal of the comparator U. If the voltage level of the fed signal is higher than that of the (−) terminal set by the resistor R and the variable resistor VR, the comparator feeds HIGH signal to the input terminal S of the system controller 15; otherwise feeds LOW signal. Thus, to the input terminal S, HIGH signal is fed in case of data being present on the video tape 16, LOW signal in absent state, accordingly the system controller 15 discriminates the signal present and absent states.

The system controller 15 produces control signals for controlling the driving means 12 in accordance with directions of the keyboard 11 and inputs of sensors and the input terminal S. For example, an output terminal D produces motor driving signals being HIGH on motor's driving. An output terminal M produces advancing direction control signals being HIGH for forward direction, and LOW for reverse. Another output terminal V produces advancing speed control signals for controlling the rotational speed of the motor, and the other output terminal P produces normal reproduction control signals being HIGH for PLAY mode.

Figure 3:
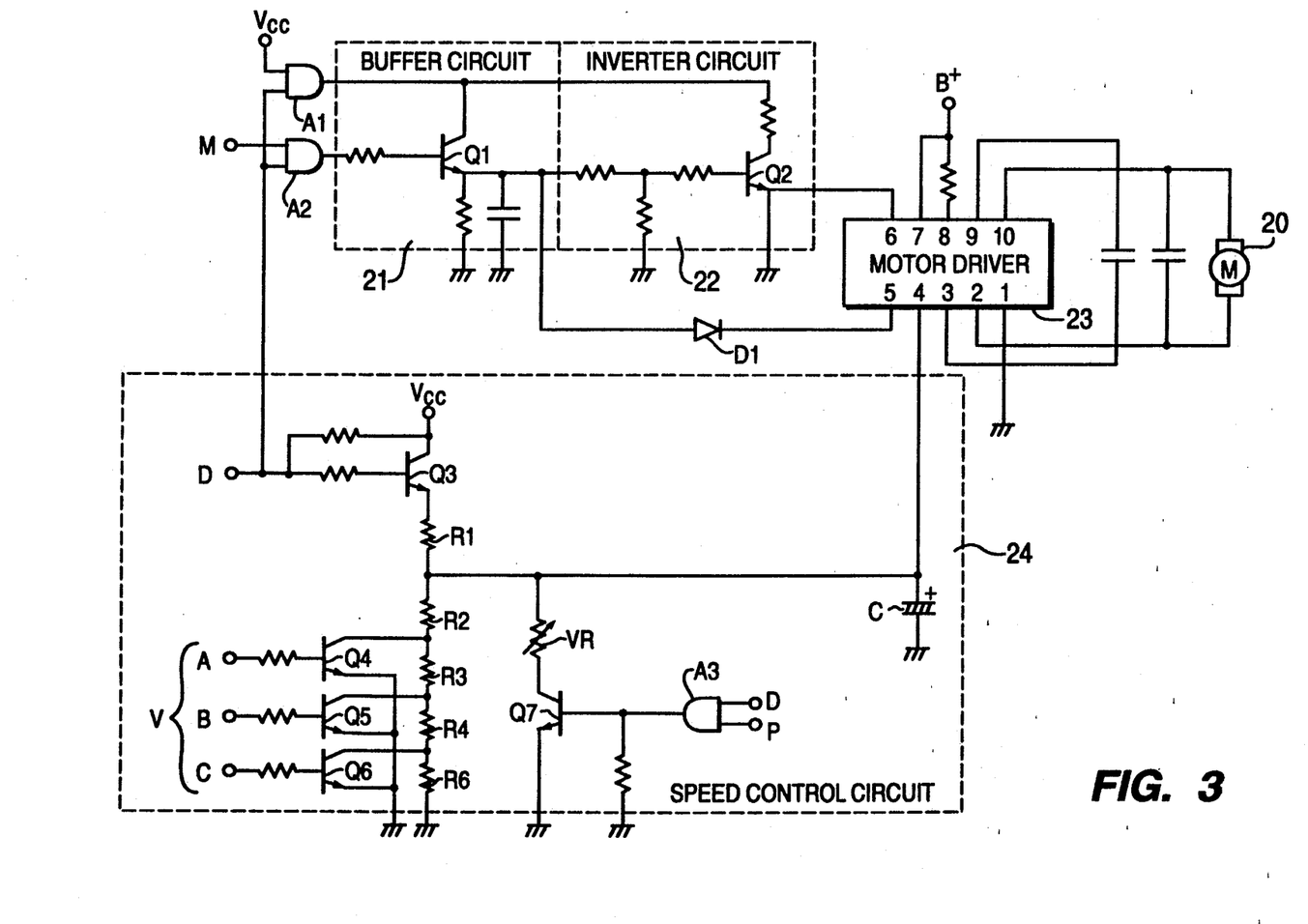
FIG. 3 is a circuit diagram showing an embodiment of the driving means shown in FIG. 2.

In FIG. 3, the driving means 12 comprises a motor 20, a buffer circuit 21, an inverter circuit 22, a motor driver 23, a speed control circuit 24 and AND gates A1, A2. When the motor driving signal of HIGH is fed to AND gates A1, A2 through the output terminal D of the system controller 15, a supply voltage Vcc is fed to the buffer circuit 21 and the inverter circuit 22 by the AND gate A1, and advancing direction control signals from the output terminal M are fed to the buffer circuit 21 by the AND gate A2. Outputs of the buffer circuit are fed to pin 5 of the motor driver 23 through a diode D1, and to pin 6 through the inverter circuit 22.

It is preferable to constitute the motor driver 23 with an exclusive driving IC which controls the rotational direction and speed of the motor 20 depending on control signals fed to input pins thereof. The driver controls the rotational direction of the motor 20 as following Table 1 according to inputs of pin 5 and 6, for example.

TABLE 1

| pin 5 | pin 6 | rotat. direction |
|---|---|---|
| H | H | stop |
| H | L | forward |
| L | H | reverse |
| L | L | stop |

Meanwhile, the speed control circuit 24 is fed speed control signals A, B, C from the output terminal V of the system controller 15, then feeds speed control voltages as following Table 2, for example, to the pin 4 of the motor driver 23, the motor driver 23 accordingly changes the supply voltage of the motor 20 to control the rotational speed of the same.

TABLE 2

| A | B | C | voltage of pin 4 |
|---|---|---|---|
| H | L | L | 1/2 Vcc |
| L | H | L | 2/3 Vcc |
| L | L | H | 3/4 Vcc |
| L | L | L | 4/5 Vcc |

In more detail, the speed control circuit 24 stepwisely levels the supply voltage Vcc fed through a transistor Q3 when the driving signal of the output terminal is HIGH, to feed to the pin 4 of the motor driver 23. The above mentioned stepwise leveling is performed transistors Q4–Q6 being turned on depending on speed control signals A, B, C fed from the output terminal V of the system controller 15, and a group of resistors R1–R5. And a variable resistor VR, a transistor Q7 and an AND gate A3 are also provided for adjusting the reference voltage of normal reproduction mode.

Figure 4:
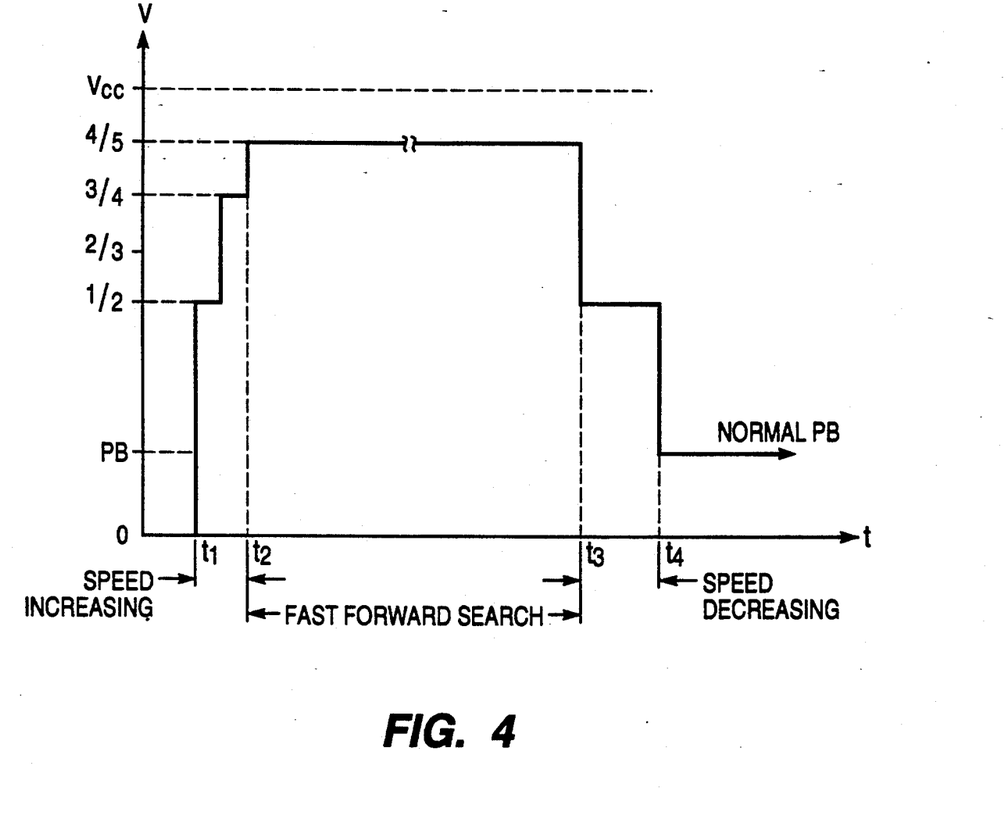
FIG. 4 is a waveform diagram showing the output of the speed control circuit shown in FIG. 3.

In FIG. 4, there is illustrated a waveform of the speed control voltage fed from the above speed control circuit 24 to the motor driver 23 in the automatic search operation. Values on vertical axis in the drawing, stands for ratios with reference to the supply voltage Vcc, in which PB corresponds to the motor driving voltage for normal reproduction, i.e., PLAY mode, 4/5 Vcc corresponds to F/F or REW mode. For example, if the AS mode is directed in the STOP mode (0-$t_1$), then the speed control circuit 24 stepwisely feeds driving voltages of ½ Vcc, ⅔ Vcc, 4/5 Vcc in sequence, to the motor driver 23 to make the motor 20 drive the video tape 16 at corresponding stepwise speeds. From time $t_2$, the driving voltage corresponding to the normal fast forward search will be fed.

Thereafter, to find the start position of signal present region on detecting the signal absent state longer than the upper limit term (time $t_3$), the controller 15 firstly reduces to the speed corresponding to 112 Vcc (time $t_4$), then drives the motor 20 at the normal reproduction speed corresponding to the normal reproduction voltage PB.

The above mentioned stepswise increase/decrease of the speed is for exact search and mitigation of impacts to the video tape 16, and the duration of each step will preferably be done in a very short term, for example within hundreds of milliseconds. In the above, sudden change of speed control voltages are compensated by a capacitor C of the speed control circuit 24.

Figure 5:
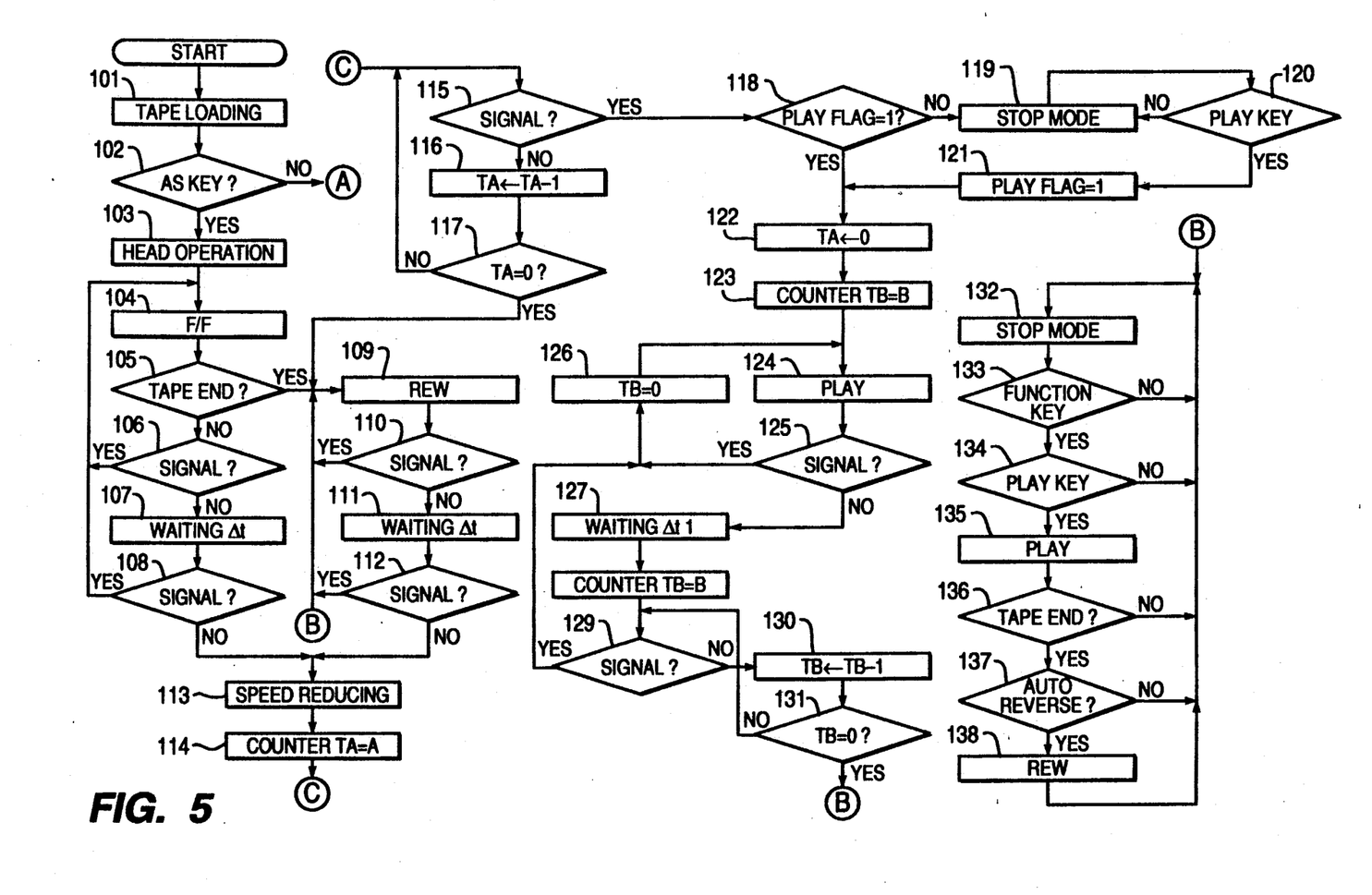
FIG. 5 is a flowchart showing control procedures of an apparatus according to the present invention.

FIG. 5 shows a flowchart of control procedures for AS mode by the system controller 15.

When the system is Powered On, if a video tape or Video cassette is loaded on the deck of the system, the system controller 15 perceives the loading of the tape through some sensors (step 101).

Then, the system controller detects the input of the AS mode directing key (step 102), if there is no input of the key, the controller executes normal operation mode of step 132 to step 138; if there is an input of AS mode directing key, the controller operates the head of the pick-up means 13 (step 103) to start the signal detecting process with picking-up recorded signals from the video tape (step 104), and stepwisely accelerates the motor 20 to execute a forward search process (step 105).

During the forward search process, a part of picked-up signals by the pick-up means 13 is converted into signals expressing the presence of recorded signals, and continuously fed to the system controller 15. Occasionally the AS mode may be directed when the video tape 16 is advanced near to the end, therefore after discriminating the detection of the trailer portion of the tape by an end detection sensor, if it to be the end of the tape, moves to the step 113 to start the reverse search process.

In the forward search process, the presence of the recorded signals is continuously discriminated (step 106), if the signal is present, program control returns to the step 104 to continue the search. If the controller detects the signal absent state, the controller waits for a prescribed time ($\Delta t$), i.e., the lower limit term against the local absent of signals (step 107), then discriminates the presence of signals again (step 108). After the lower limit term, if the signal is detected again, the forward search process is continuously executed; otherwise step 113 is performed. The reverse search process executed in a similar manner as above (step 109–step 112).

If the controller detects the signal absent state longer than the lower limit term, the advancing speed is reduced by half (step 113), and a prescribed value A is loaded into a time counter register TA in the system controller (step 114).

The above mentioned value A is set for discriminating the lapse of the upper limit term, and the sum of the lower limit term and the time corresponds to the value A makes the upper limit term. But, the value A can be used as the upper limit term as the lower limit term is relatively short period.

Then, the controller again discriminates the presence of signals (step 115), and repeats the discrimination with subtracting by 1 from the TA in case of signal absence (step 116) until the register TA holds a value "0" (step 117).

If the signal present state is not detected before the TA's being "0", that is the lapse of the upper limit term, the controller concludes it to be the end of the program recorded region to move the step 109, starts the reverse search process; otherwise it moves to the step 118.

If the previous mode of AS mode is PLAY mode, a play flag may have been set to "1". Therefore, controller discriminates the play flag to be "1" (step 118), if it is not "1", the controller enables a STOP mode; if it is "1", controller clears the register TA (step 122) and execute the reproduction mode after step 123.

After moving to the STOP mode of step 119, the system follows normal operations if the AS mode is released; if the reproduction key is inputted with the AS mode not being released (step 120), sets the play flag to "1" (step 121) and executes the reproduction process.

In the reproduction process, sets a prescribed value B to a time counter register TB, firstly (step 123). The value B also corresponds to the upper limit term as the above value A. Both values stand for the same length in the video tape 16, but the values are distinguished by the rate of the advancing speed of the fast forward search to that of the normal reproduction. Accordingly, the values A, B are set to satisfy the equation $B = K \cdot A$ ($0 < K < 1$), where the K is the ratio of the advancing speed of the normal reproduction to that of the fast forward search, that is, the ratio between motor driving voltages for both operations.

On executing the reproduction process (step 124), continuously discriminates the presence of signals (step 125), if the signal is present, the controller continues to execute the reproduction. Otherwise, the controller waits for a prescribed time $\Delta t_1$, i.e. a lower limit term (step 127), then allocates the value B to the time counter register TB again (step 128), then again discriminates the presence of signals (step 129). The lower limit term $\Delta t_1$ and the term $\Delta t_1$ of the fast forward search process have the same relations as between the value A and B.

If a signal present state is detected again at the step 129, the controller returns to the step 126 to continue the reproduction process; otherwise subtracts TB by 1 (step 130) until it being "0" (step 131). Then, the controller concludes it to be the end of the recorded region, and starts to execute the reward search after the step 109. Meanwhile, if a signal present state is detected before the TB being "0", the controller clears TB (step 126) and continues the reproduction process.

Steps after 132 illustrate an example of normal operations when the AS mode is not directed. From a STOP mode (step 132), the system is operated depending upon the input of function keys (step 133). For example, if the play key is inputted (step 134), the controller executes the PLAY mode (step 135). If the tape end is detected (step 136) the controller discriminates the setting of an automatic rewind mode (step 137) to rewind the tape (step 138) and moves to STOP mode to quit the operation (step 132).

According to the present invention, the record/play system automatically discriminates the program present regions and absent regions of a record medium to execute the search or reproduction, thereby enabling to find the required program easily. Moreover, even if there remains a long portion without recorded program, the search of recorded program of the record medium can be executed without unnecessary reproduction before the detection of the trailer portion.

Accordingly, the present invention can be widely adopted for various kinds of Audio/Visual sets, especially for educational systems.

What is claimed is:

1. An automatic search method in a system for reproducing recorded signals from a recording medium, said method comprising:

when an automatic search key of said system for providing user activation of an automatic search mode is not activated, enabling a normal operation mode of said system; and when said automatic search key is activated, enabling said automatic search mode of the system, said automatic search mode comprising:
- a forward search process including finding start positions of programs while fast-forwarding said recording medium by detecting a signal-absent state of said recorded signals being greater than a lower limit term and less than a first upper limit term, said signal-absent state being a time period in which said recorded signals are continuously not detected on said recording medium;
- a reverse search process including finding the start positions of said programs while rewinding said recording medium by detecting said signal-absent state being greater than said lower limit term and less than said first upper limit term; and
- a reproduction process including reproducing said programs in response to finding said start positions, and enabling said reverse search process in response to detecting said signal-absent state corresponding to an end of the recorded portion of said recording medium when said signal-absent state is greater than a second upper limit term.

2. The method as claimed in claim 1, wherein, at beginnings of said forward search process and said reverse search process, an advancing speed of said recording medium is accelerated in a stepwise fashion.

3. The method as claimed in claim 1, wherein if said signal-absent state is detected as being greater than said lower limit term during said forward and reverse search processes, an advancing speed of said recording medium is reduced in a stepwise fashion.

4. The method as claimed in claim 1, wherein said first upper limit term and said second upper limit term are greater than a predetermined maximum length of the signal-absent state between said programs in a fast-forward mode and a play mode, respectively.

5. The method as claimed in claim 4, wherein a ratio of said first upper limit term to said second upper limit term is equal to a ratio of advancing speeds of said recording medium during said forward search process and said reproduction process.

6. An automatic search method of a reproducing system for reproducing recorded signals from a recording medium, said method comprising:
- a forward search process for locating, during a fast forward operation, beginnings of programs on said recording medium and enabling a play mode in response to no recorded signals being detected on said recording medium for a first predetermined time period;
- a reverse search process for locating said beginnings of said programs on said recording medium and enabling said play mode in response to no recorded signals being detected during a rewind operation on said recording medium for said first predetermined time period; and
- an interim process for disabling said play mode and enabling said reverse search process when an end of said recording medium is determined by failing to detect said recorded signals on said recording medium for a second predetermined time period.

7. The automatic search method of claim 6, wherein said forward search process comprises the steps of:
- determining whether no recorded signals are detected for said first predetermined time period while fast-forwarding said recording medium;
- determining whether no recorded signals are detected on the record medium for a third predetermined time period in response to detecting no recorded signals for said first predetermined time period;
- determining that a beginning of a program is found if recorded signals are detected during said third predetermined time period; and
- enabling said reverse search process in response to failing to detect said recorded signals during said third predetermined time period.

8. The automatic search method of claim 6, wherein said reverse search process comprises the steps of:
- determining whether no recorded signals are detected for said first predetermined time period while rewinding said recording medium;
- determining whether no recorded signals are detected on said recording medium for a third predetermined time period in response to detecting no recorded signals for said first predetermined time period;
- determining that a beginning of a program is found if recorded signals are detected during said third predetermined time period; and
- continuing with said reverse search process in response to failing to detect said recorded signals during said third predetermined time period.

9. An automatic search and playback method for a system for reproducing recorded signals from a recording medium, said method comprising:
- fast-forwarding said recording medium while detecting of said recorded signals on said recording medium in response to selection of forward search mode;
- reducing a transport speed of said recording medium and initiating a count of a second predetermined time period in response to detecting a signal absent state for a first predetermined time period, said signal absent state being a condition in which said system fails to detect any said recorded signals;
- enabling a playback mode in response to detecting said recorded signals before an expiration of said second predetermined time period;
- initiating count of a third predetermined time period in response to failing to detect said recorded signals during said playback mode;
- determining an end of a recorded portion of said recording medium during said playback mode in response to failing to detect any said recorded signals for said third predetermined time period; and
- enabling a reverse search mode in response to the determination of said end of said recorded portion.

10. An automatic search and playback method as claimed in claim 9, wherein said reverse search mode comprises:
- rewinding said recording medium while detecting said recorded signals on said recording medium in response to one of user selection and enablement of said reverse search mode;
- reducing the transport speed of said recording medium and initiating the count of said second predetermined time period in response to failing to detect any said recorded signals for said first predetermined time period;
- enabling said playback mode in response to detecting said recorded signals before the expiration of said second predetermined time period.

* * * * *